United States Patent Office 2,848,495
Patented Aug. 19, 1958

2,848,495

METHOD OF MANUFACTURE OF AMINES

Lucien Villemey, Paris, France, assignor to Societe Industrielle des Derives de l'Acetylene (S. I. D. A.), Paris, France, a corporation of France No Drawing. Application October 18, 1955
Serial No. 541,300

Claims priority, application France October 28, 1954

5 Claims. (Cl. 260—585)

The present invention has for its object a method of manufacture of amines by the reaction of primary or secondary alcohols with ammonia.

It has already been proposed to prepare amines by hydrogenation of a mixture of an aldehyde or of a ketone with ammonia in the presence of a hydrogenation catalyst. This operation is easily carried out since the process can be effected at a moderate temperature and at a relatively low pressure. The necessity of introducing hydrogen when the operation is started with aldehydes or with ketones increases, however, the cost of manufacture and makes the apparatus more complex.

It is also known that it is possible to obtain amines by the direct reaction of an alcohol with ammonia in the presence of a dehydration catalyst such as alumina, or of a metal such as nickel or copper. However, this method which utilises an alcohol as a primary substance generally necessitates high temperatures and pressures, particularly when starting with aliphatic alcohols of low molecular weight. On the other hand, the presence of catalysts and the use of high temperatures tend to give rise to secondary reactions such as the dehydration of the alcohol to hydrocarbon, and the formation of nitriles, which reduces the efficiency of the process. Attempts have been made to compensate for these drawbacks, at least in part, by working in the presence of a large excess of ammonia; in that case however, it is found impossible to obtain selectively primary amine or secondary amine or tertiary amine and it thus becomes necessary to proceed to re-cycling of the ammonia and the amines. In order to avoid the formation of nitriles, it even becomes necessary in most cases to operate in a medium diluted with hydrogen, and this increases the difficulty of recuperation of the volatile products.

Now, since alcohols are generally substances having less value than the corresponding aldehydes and ketones, it is preferable, in spite of these various drawbacks, to utilise alcohols as the primary substances.

Attempts have been made to evolve a method of manufacture of amines which would avoid the drawbacks of the known methods whilst retaining all their advantages. It has, in fact, been found that the presence of the aldehyde or the ketone greatly accelerates the speed of the reaction between the corresponding alcohol and the ammonia.

The catalytic process of manufacture of amines, starting from primary or secondary alcohols, in accordance with the present invention, is characterised by the fact that the catalytic reaction of the alcohol and the ammonia is carried out in the presence of a hydrogen-accepting substance, used as a reaction accelerator, preferably a small quantity of the aldehyde or the ketone which corresponds to the alcohol initially used. The aldehyde or the ketone may either be introduced from the exterior or they may be formed in situ by the oxidation or de-hydrogenation of a part of the alcohol before it is converted to amine. The proportion of aldehyde or ketone added in this way may vary to very considerable extents, depending on the temperature, the pressure or the duration of the reaction which is selected, these various factors being furthermore inter-dependent on each other. Generally speaking, there is little advantage in practice in introducing less than 5% or exceeding 30% by weight of aldehyde or ketone with respect to the weight of the alcohol employed in the conversion.

The other conditions of the reaction, and in particular the temperature, depend on the proportion of aldehyde or of ketone thus added to the reaction medium, and also on the nature of the alcohol with which the operation is started.

The hydrogen-transfer catalyst employed may be nickel, cobalt or copper or one of the noble metals such as platinum or palladium, in one or the other of the forms usually employed in hydrogen-transfer reactions and which may in some cases be deposited on a support. The aldehyde or the ketone employed as a hydrogen-accepting substance and as a hydrogenation accelerator are generally recovered unchanged after the end of the reaction.

In the state of previous knowledge, which recommended the carrying out of the operation in the presence of hydrogen, in particular when the amination is catalysed by hydrogenation catalysts, it was entirely unforseeable that the presence of an oxidised derivative of the alcohol would facilitate its amination. It would appear that the phenomena corresponding to the present invention may be explained as follows:

The direct amination of an alcohol, carried out in the known manner in the presence of a dehydration catalyst, may be represented by the following equation, in which R is an organic radical and R' is an organic radical or an atom of hydrogen:

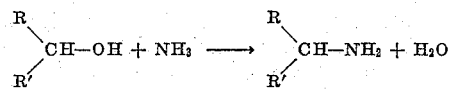

For this reaction, a high temperature and a high pressure are generally necessary.

The amination of aldehydes and ketones which is also known, is an entirely different reaction which may be represented by the equation:

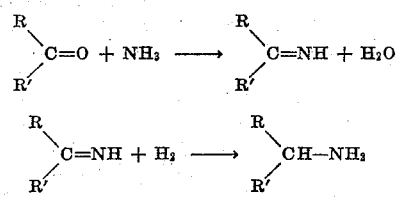

This amination is produced in the presence of hydrogenation catalysts, and at a relatively low temperature and pressure.

Now it is known that in the presence of these same hydrogenation catalysts, which are in reality hydrogen-transfer catalysts, the alcohols are de-hydrogenated in a reversible manner to the corresponding aldehydes or ketones:

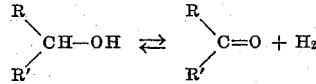

The balance is generally such that the alcohol is predominant. But if this reaction is carried out in conditions in which one of the two products or both of the products are eliminated, the equilibrium will be entirely displaced from the left towards the right. That is what takes place when the operation is carried out in the presence of ammonia; the reaction of amination of alcohols, catalyzed by means of hydrogenation catalysts, may then be written:

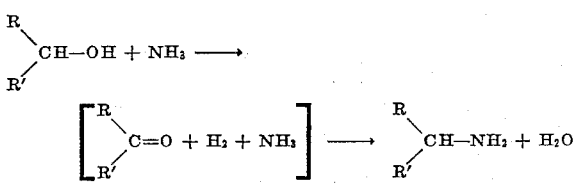

It is remarkable that each of these two reactions which follow each other should be induced by the same hydrogenation catalysts or hydrogen-transfer catalysts, whilst the direct amination of alcohols is normally induced by de-hydration catalysts.

In spite of the fact that the initial substances and the final products are identical, this difference in the nature of the catalysts clearly proves the existence of two separate reaction processes. The amination of alcohols induced by hydrogen-transfer catalysts can only be employed in practice if it is fairly rapid; this condition is only obtained when, in accordance with the present invention, there is introduced from the beginning of the process, a hydrogen-accepting substance which displaces the balance of de-hydrogenation of the alcohol, during the first stage of the reaction.

The said hydrogen-accepting substance, which can usefully be the aldehyde or the ketone corresponding to the alcohol used as the primary substance, may also be an oxidation or de-hydrogenation agent which gives rise to the formation of aldehyde or ketone by oxidation or de-hydrogenation of the alcohol. This prior state of oxidation can be created, for example, by causing the hydrogen-transfer catalyst to react on the alcohol, whether in the presence of ammonia or not, in such manner that the molecular hydrogen escapes and that a sufficient quantity of aldehyde or ketone accumulates in the alcohol. It may suffice to bring the alcohol, with the catalyst added, up to boiling point for a sufficient time at atmospheric pressure; but in most cases, it is simpler to add from the beginning the small quantity of aldehyde or of ketone which is necessary.

The method in accordance with the present invention lends itself especially well to an application in the liquid phase, but its application in the vapour phase is also possible. In the case in which the operation is carried out in the liquid phase, there is generally an advantage in applying a pressure sufficient to ensure the introduction or the maintenance of the ammonia in the reaction medium.

The reaction may be carried out just as well in an anhydrous medium as in the presence of water. In the first case, the concentration of amine in the raw product is higher. In the second case, the self-generated pressure of the mixture is lower when the operation is carried out in the liquid phase.

Amongst the numerous advantages obtained by the use of the process which forms the object of the invention, particular mention may be made of the following:

(1) The use of a much lower reaction temperature for a rate of conversion equal to or greater than that which would be obtained without the addition of aldehyde or of ketone;

(2) The need for a much lower pressure;

(3) A shorter reaction period, which results in a substantial increase in the productivity of each apparatus;

(4) A particularly high efficiency due to the suppression of secondary reactions which are met with in the known methods and which produce ethylenic hydrocarbons or nitriles;

(5) The selective production of a predominant quantity of primary, secondary or tertiary amine, by virtue of the fact that the operation is carried out without excess of ammonia, which, at the same time enables the re- cycling operations, necessary up to the present time, to be dispensed with.

The invention will be explained in greater detail in the description given below of a number of examples which embody the method which forms its object, these examples not being in any manner contrued as limiting the scope of the invention.

*Example 1*

There were charged into an autoclave, 10 moles of isopropanol or 600 grams, with 10 moles of anhydrous ammonia, or 170 grams, and 120 grams of Raney nickel. The mixture was brought up to 180° C. for 3 hours. The pressure in the autoclave rose by its own internal action to 250 kilograms per sq. cm.

After cooling down the autoclave, it was found that 4.5 moles of iso-propanol had been converted to iso-propyl-amine.

*Example 2*

The same quantities of iso-propanol, ammonia and Raney nickel, as given in Example 1, were loaded into an autoclave, and there was added 100 grams of acetone. The mixture was heated to 120° C. for 3 hours. The pressure in the autoclave never exceeded 12 kilograms per sq. cm.

After cooling down the autoclave, it was found that 6 moles of iso-propanol had been converted to iso-propyl-amine, whilst the quantity of acetone added had been almost wholly recovered in the reaction product.

*Example 3*

An autoclave was charged with 10 moles of iso-propanol, or 600 grams, 10 moles of ammonia, or 170 grams, 80 grams of water, 150 grams of acetone, and 120 grams of Raney nickel. The mixture was then heated to 150° C. for 3 hours. The pressure reached 29 kilograms per sq. cm. After cooling down the autoclave, it was found that 7.15 moles of iso-propanol had been converted to iso-propyl-amine, whilst the quantity of acetone added had been almost wholly recovered in the reaction product.

*Example 4*

An autoclave was charged with 10 moles of iso-propanol, or 600 grams, 10 moles, or 170 grams of ammonia, 80 grams of water, 150 grams of acetone and 120 grams of Raney nickel. The mixture was heated to 60° C. for 3 hours. The pressure inside the autoclave did not exceed 6 kilograms per sq. cm.

After cooling down the autoclave, it was found that 3.3 moles of iso-propanol had been converted to iso-propyl-amine, whilst the quantity of acetone added was almost wholly recovered in the reaction product.

What I claim is:

1. A method of manufacturing isopropylamine comprising aminating isopropanol with ammonia at a temperature between about 60° C. and 150° C. under autogenous pressure in the presence of an amination catalyst and a hydrogen-accepting substance selected from the group consisting of the aldehydes and ketones corresponding to the isopropanol.

2. A method according to claim 1 wherein the hydrogen-accepting substance is present in an amount ranging 5% to 30% by weight of the isopropanol.

3. A method according to claim 1 wherein the hydrogen-accepting substance is acetone.

4. A method according to claim 1 wherein the hydrogen-accepting substance is formed within the reaction mixture by the partial de-hydrogenation of isopropanol.

5. A method according to claim 1 wherein the hydrogen-accepting substance is formed in the reaction mixture by the partial oxidation of isopropanol.

References Cited in the file of this patent

UNITED STATES PATENTS 2,519,560    Fowler _____ Aug. 22, 1950